United States Patent
Chen et al.

[11] Patent Number: 5,837,085
[45] Date of Patent: Nov. 17, 1998

[54] METHOD OF MAKING A TOOTHED BELT WITH A REINFORCED FABRIC COVERING

[75] Inventors: Te-Cheng Chen, Chung-Li; Mao-Song Lee, Hsinchu; Ruey-Sheng Shih, Hsinchu Hsien; Huo-Sheng Liao, Hsinchu, all of Taiwan

[73] Assignee: Industrial Technology Research Institute, Hsinchu, Taiwan

[21] Appl. No.: 633,230

[22] Filed: Apr. 16, 1996

[51] Int. Cl.$^6$ .............. B31F 1/28; B32B 31/08; F16S 5/08

[52] U.S. Cl. .......... 156/138; 156/205; 156/290; 156/293; 156/140; 156/472; 264/135; 264/136; 264/137; 264/168; 264/259; 264/267; 264/269

[58] Field of Search .............. 264/135, 136, 264/137, 168, 259, 267, 269, 134; 156/205, 290, 293, 137, 138, 139, 140, 472

[56] References Cited

U.S. PATENT DOCUMENTS

| | | | |
|---|---|---|---|
| 2,328,909 | 9/1943 | Kilborn | 18/6 |
| 2,626,429 | 1/1953 | Merrill | 264/137 |
| 2,838,416 | 6/1958 | Babiarz et al. | 264/137 |
| 3,025,963 | 3/1962 | Bauer | 156/205 |
| 3,250,653 | 5/1966 | Geist et al. | 156/138 |
| 3,560,601 | 2/1971 | Johnson et al. | 264/154 |
| 3,880,558 | 4/1975 | Breher et al. | 425/115 |
| 3,891,364 | 6/1975 | Muller | 425/28 B |
| 3,936,339 | 2/1976 | Lock et al. | 156/205 |
| 3,973,894 | 8/1976 | Lindner et al. | 425/370 |
| 3,981,206 | 9/1976 | Miranti, Jr. et al. | 74/233 |
| 3,989,580 | 11/1976 | Hoback et al. | 156/472 |
| 4,083,838 | 4/1978 | Breher | 264/145 |
| 4,251,306 | 2/1981 | Breher | 156/138 |
| 4,268,471 | 5/1981 | Breher | 264/259 |
| 4,486,375 | 12/1984 | Hirai | 264/254 |
| 4,515,743 | 5/1985 | Breher | 264/135 |
| 4,589,941 | 5/1986 | Tanaka et al. | 264/162 |
| 4,836,874 | 6/1989 | Foster | 264/78 |
| 5,336,461 | 8/1994 | Ohtani et al. | 264/294 |
| 5,376,203 | 12/1994 | Syme | 156/472 |

*Primary Examiner*—Jan H. Silbaugh
*Assistant Examiner*—Robin S. Gray
*Attorney, Agent, or Firm*—Sughrue, Mion, Zinn, Macpeak & Seas, PLLC

[57] ABSTRACT

A method of making a toothed belt. A toothed belt is made by guiding a strip of fabric to pass through a thermosetting resin to soak it with thermosetting resin, then the soaked fabric is guided to pass through a pair of toothed rollers to form a series of toothed grooves thereon, thereafter the fabric is guided to pass around a plane roller and simultaneously rubber material is fed into the space between the outer peripheral surface of the plane roller and said fabric. Then, the fabric is wound onto a cylindrical mold having corresponding toothed grooves thereon and its two ends are glued together to loop around the cylindrical mold, then reinforcing cords and rubber sheets are covered over the fabric. Finally, the rubber material is vulcanized to form a toothed belt. Fabrics treated by the method demonstrate considerably greater flexibility or extendibility to comply with bending when under operation. Furthermore, the tooth contour of the belt will be more accurate than conventional ones. Also, the two flat ends of each piece of the fabric are coated with a thin layer of rubber material which can also be used as an adhesive, this will facilitate the gluing of the two ends of each piece of fabric.

9 Claims, 5 Drawing Sheets

METHOD OF MAKING A TOOTHED BELT WITH A REINFORCED FABRIC COVERING

BACKGROUND OF THE INVENTION

This invention relates to a method of making a toothed belt, particularly to a method of making a toothed rubber belt with a reinforced fabric covering, and more specifically to a method of making the teeth of a toothed rubber belt with a reinforced fabric covering.

Power transmission belts used with toothed pulleys are well known in the art. These belts have a plurality of alternating teeth and grooves extending generally transversely across the belt which mesh with alternating teeth and grooves of the toothed pulley to perform the power transmission function. The advantages of power transmission by a toothed belt and a toothed pulley reside in (1) no slippage (2) reducing the space required by the whole power transmission system (3) no need of high initial tension (4) low noise operation (5) precise and positive transmission.

U.S. Pat. No. 3,078,206 disclosed a "flow through method" of molding positive drive belts, which includes the steps of: wrapping a jacket fabric around a grooved mold, winding reinforcing cord over the jacket, wrapping a layer of unvulcanized rubber over the cord; applying pressure to force the rubber through cord into tooth cavities to form teeth on the belt; and vulcanizing the rubber portion of the belt.

U.S. Pat. Nos. 3,250,653 and 3,973,894 disclosed a "tooth preform method" of molding positive drive belts, which includes the steps of: placing an enveloping fabric with preformed teeth profile on the core of belt building device, and filling tooth groves with plastic raw material.

U.S. Pat. No. 2,507,852 disclosed an "extruded tooth method" of molding positive drive belts, which includes the steps of: superimposing a layer of fabric on a cylindrical mold having toothed grooves thereon; embedding rubber strips into the toothed grooves to have the layer of fabric disposed between the toothed grooves and the rubber strips; winding reinforcing threads around the outer circumference of the cylindrical mold; applying a layer of moldable rubber over the threads; and vulcanizing the rubber under pressure to form the toothed section of the belt.

The above-described are conventional methods of making tooth belt. The concerned tooth preform method could be completed by several approaches, the following cases illustrate this method.

U.S. Pat. No. 3,973,894 disclosed a method of and device for the production of toothed belts of rubber or rubber-like materials with an enveloping fabric covering. The device includes a heated molding roller with axial tooth grooves distributed over roller circumference, and an endless mold belt around the roller with uniform teeth engaging the grooves. The fabric web is guided to pass through the gap of the rotating heated molding roller and mold belt, then is cooled to set the tooth profile, and preformed profiled rubber strands are inserted in the hollow folds. This patent also disclosed a method to form the toothed fabric. A device composed of flat plate is provided with tooth grooves, and pertains pressure plate composed of a plurality of independent lamellae with protrusions in conformity with the belt tooth shape, each lamellae moves upward and downward while a positive guiding side passes over. The lamellae can be pressed successively downwardly into the pertain groove, and the fabric with tooth shape will be formed.

U.S. Pat. No. 4,486,375 disclosed a method of and device for the production of toothed belts. A plate having teeth formed thereon is impressed, in a consecutive manner, onto a layer of fabric coated by P U (polyurethane) to form a serious of folds corresponding to the belt teeth to be formed on the fabric, then the fabric is brought to bear on an inner mold having corresponding toothed grooves thereon. After winding reinforcing threads on the fabric, an outer mold is sleeved around the fabric to enable the injection of rubber material into the mold cavity formed by the outer and the inner molds, thus molding a toothed belt.

U.S. Pat. No. 5,176,867 disclosed that a pair of cylindrical meshing rubber gears are made and used to form a series of toothed grooves on a looped fabric by the shrinkage of a film, then the fabric is moved to apply on a cylindrical metal gear (inner mold), and thereafter reinforcing threads are wound on the fabric, and subsequently an outer mold is disposed around the cylindrical metal gear to enable the injection of rubber material into the mold cavity formed by the outer and the inner molds.

U.S. Pat. No. 4,343,666 disclosed a method of making a toothed belt, which includes the steps of: (a) wrapping a fabric around a cylindrical mold having circumferentially spaced alternating axial grooves and ridges; (b) wrapping a layer of elastomeric material around the fabric; (c) applying pressure in helical fashion against the elastomeric layer to force a portion of the elastomeric material and the fabric into the axial grooves; (d) winding a load-carrying cord in helical fashion; (e) wrapping a layer of elastomeric material over the cord; and (f) vulcanizing the belt under heat and pressure.

The major difference between a toothed belt and a traditional power transmission belt resides in that teeth are provided on the toothed belt to enable a positive power transmission to be performed. Therefore, how to mold the teeth part precisely is mostly concerned. Especially, in the case of molding the teeth with a layer of reinforcing fabric covering the toothed surface, the reinforcing fabric must stretch out along the tooth surface and not to be breached or shrink back and alter teeth shape due to the shortage in length of the fabric or incur any creases due to excess length of the fabric.

SUMMARY OF THE INVENTION

It is an object of this invention to provide a method of making a toothed belt having precise tooth shape in a continuous and speedy way.

It is another object of this invention to provide a method of making a toothed belt that is resistant to being breached or having creases formed therein.

The method of this invention includes the steps of: (a) guiding a strip of fabric to pass through a thermosetting resin so as to soak the fabric with thermosetting resin; (b) guiding the soaked fabric to pass through a pair of heated and toothed rollers having their outer teeth meshed together in a conjugated way so as to harden the resin and to form a series of toothed grooves on the fabric at the same time; (c) keeping the fabric sticking on the toothed roller located at downstream side of the fabric and simultaneously guiding the fabric to pass by a rotating plane roller in a manner that the fabric moves in downstream direction at the guidance of the rotating plane roller, the rotating plane roller having a smooth outer peripheral surface and being disposed at a distance substantially equal to the thickness of the fabric with the toothed roller located at downstream side of the fabric, and at the same time feeding rubber material into the space between the outer peripheral surface of the plane roller and the fabric so as to fill the toothed grooves of the fabric with rubber material and coat the fabric with a thin layer of rubber material; (d) wrapping the fabric together with rubber material thereon onto a cylindrical mold having corresponding toothed grooves formed on its outer peripheral surface and gluing its two ends together to loop around the cylindrical mold in such a manner that the fabric surface having rubber material coated thereon faces outward and the teeth formed in each fabric piece mesh with the toothed grooves of the cylindrical mold; (e) covering the fabric together with rubber material thereon with cords and rubber sheets; and (f) vulcanizing the rubber material on the fabric to form a toothed belt.

Preferably, the method further includes a step (a1), between step (a) and step (b), of guiding the soaked fabric to pass through one pair of squeezing rollers to squeeze excess resin out from the fabric.

Preferably, the toothed grooves formed in the toothed roller located the downstream of the fabric have a shape corresponding to that of the teeth of the belt to be made.

Preferably, in step (c), the rubber material is preheated before being filled into toothed grooves and the plane roller is provided with a cooling device.

Preferably, the fabric is produced in the form of a long strip and steps (a) and (b) are performed in a continuous manner, and the fabric is cut into pieces of predetermined length before winding onto the cylindrical mold in step (d).

Preferably, the two ends of each piece of the corrugated fabric of tooth shape are selected to be flat to enable one to overlap the other.

Preferably, the method further includes a step (a2), between step (a1) and step (b), of baking the soaked fabric.

Preferably, the thermosetting resin consists of phenol-formaldehyde, epoxy, polyurethane, mixtures thereof, and their modifiers.

Preferably, the thickness of the fabric is set to be less than the difference between the outer diameter and the pitch diameter of the toothed rollers.

DETAILED DESCRIPTION OF THE INVENTION

Figure 1:
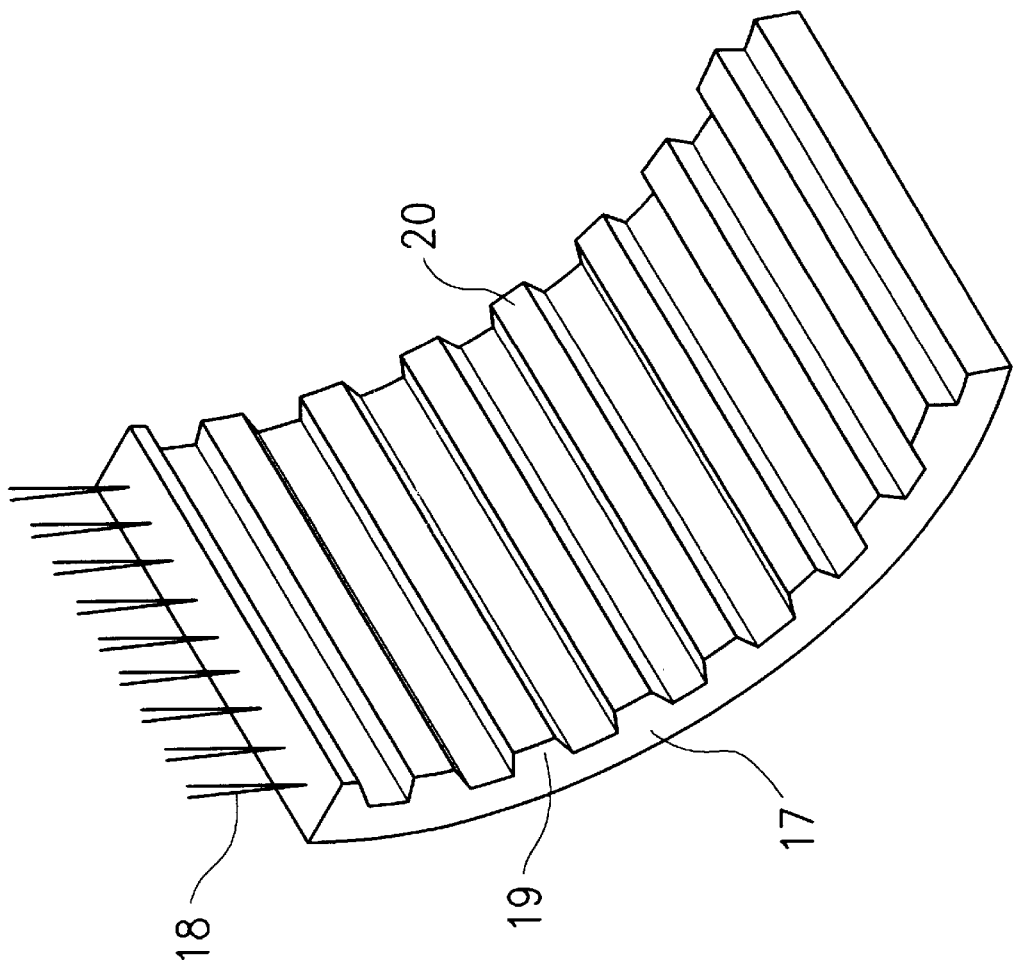
FIG. 1 is a perspective view showing the construction of a toothed belt.
Figure 2:
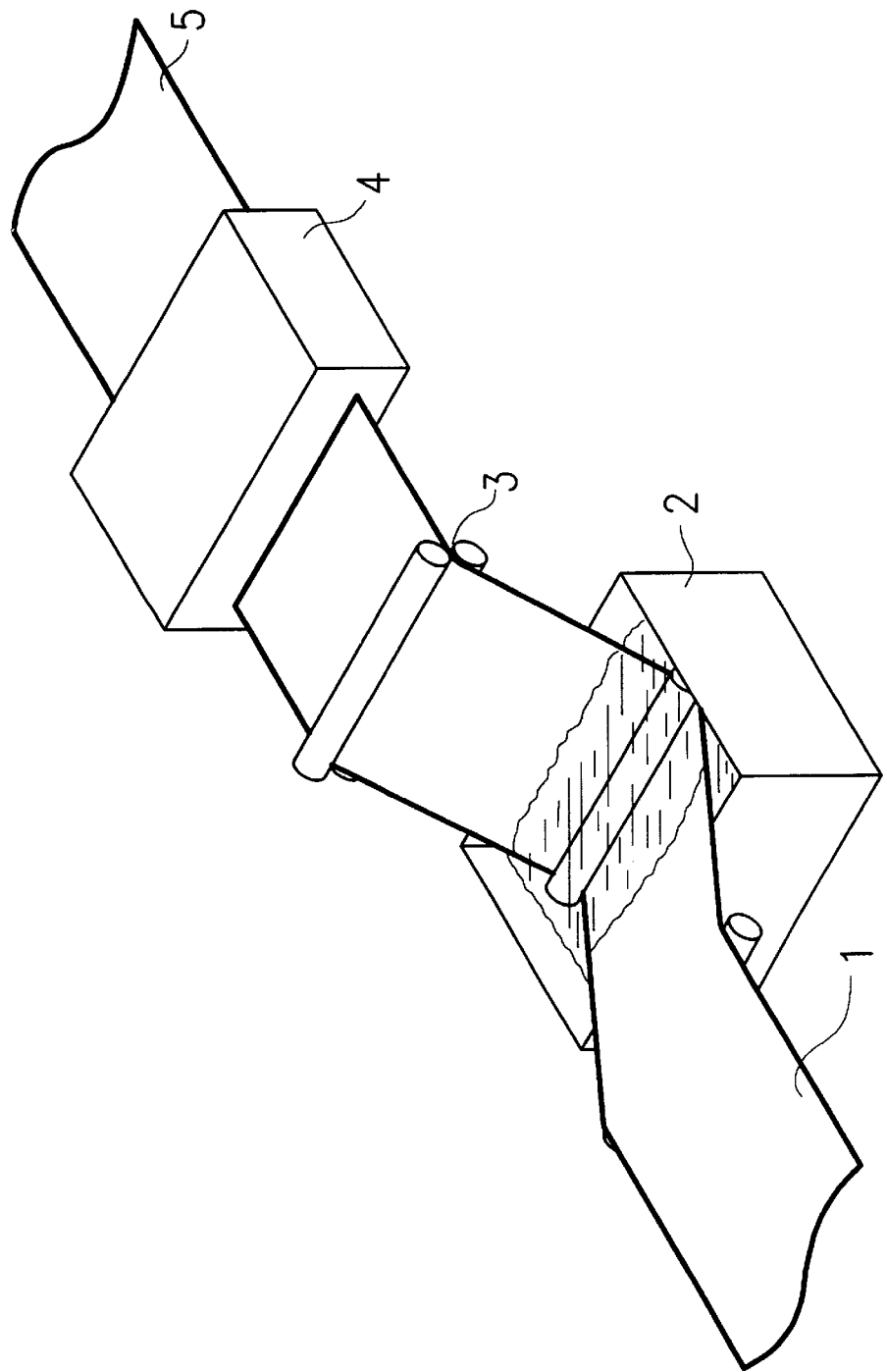
FIG. 2 is a perspective view showing a strip of fabric being passed through a resin reservoir.

To produce a toothed belt, as shown in FIG. 2, a strip of fabric 1 of the proper thickness is first guided in a succeeding manner to pass through a reservoir 2 in which thermosetting resin is stored, a pair of squeezing rollers 3 for expelling excess resin from the soaked fabric 1, and a baking box 4 for drying the soaked fabric 1. The thermosetting resin consists of phenol-formaldehyde, epoxy, polyurethane, or mixtures thereof, and their modifiers.

Then, the soaked and dried fabric 5 is brought to pass through one pair of preheated toothed rollers 6, 7 having toothed grooves formed on their outer peripheral surfaces and simultaneously hardening the resin so as to form a series of toothed grooves on the fabric 5 in a continues manner. The thickness of the fabric 5 is set to be less than the difference between the outer diameter and the pitch diameter of the toothed rollers 6, 7. After passing through the toothed rollers 6, 7, the fabric 5 is guided to pass through a gap between the lower toothed roller 6 and a plane roller 8. At the same time, a layer of preheated rubber material 9 (at a temperature between 40° C. and 120° C.) is also brought to pass through the gap between the lower toothed roller 6 and the plane roller 8. By this, the layer of preheated rubber material 9 is forced to fill in the toothed grooves formed in the fabric 5 (see FIG. 4).

Figure 3:
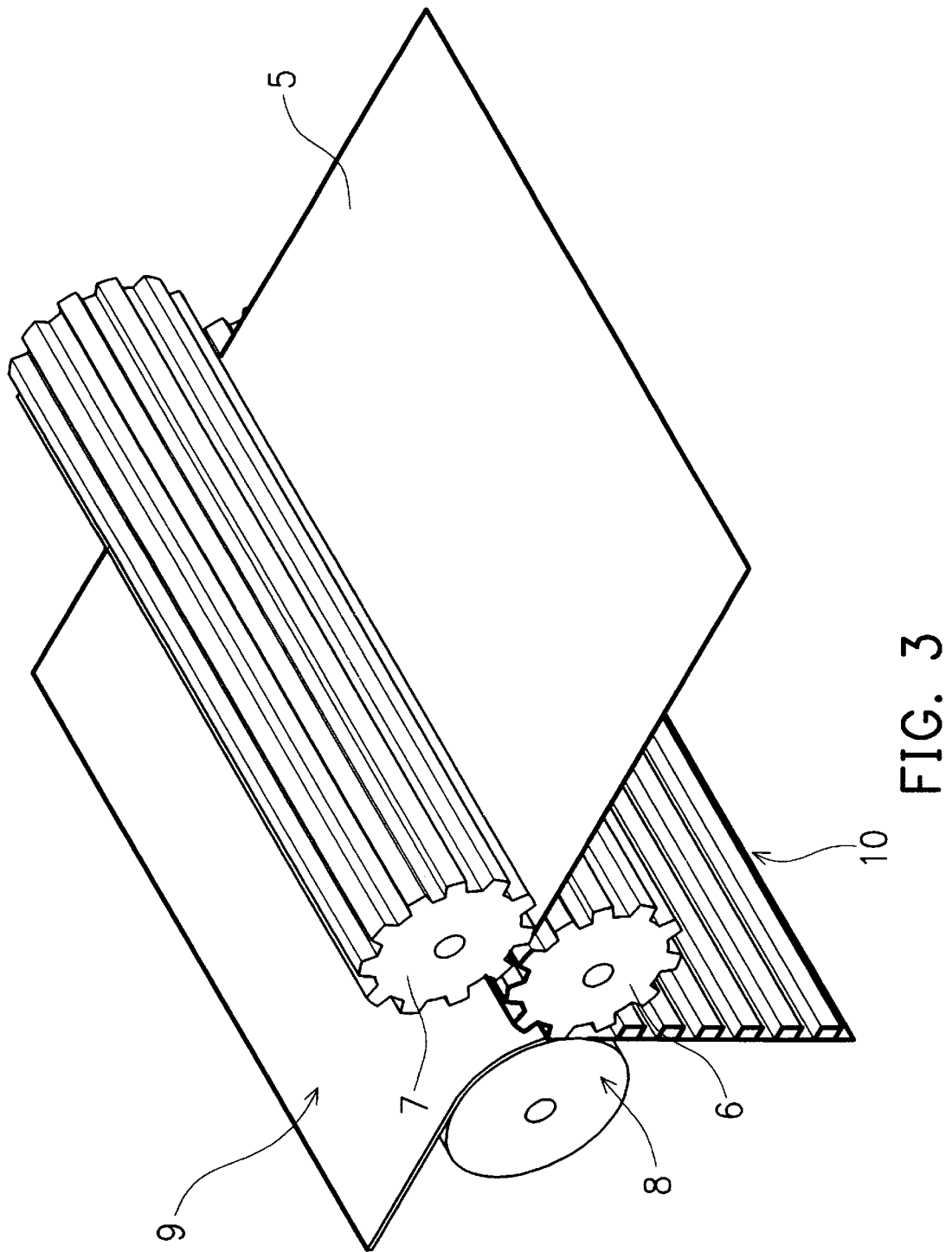
FIG. 3 is a perspective view showing a strip of fabric soaked with thermosetting resin being guided to pass through a pair of toothed rollers to form a series of toothed grooves therein and a layer of rubber material being brought to fill in the toothed grooves.
Figure 4:
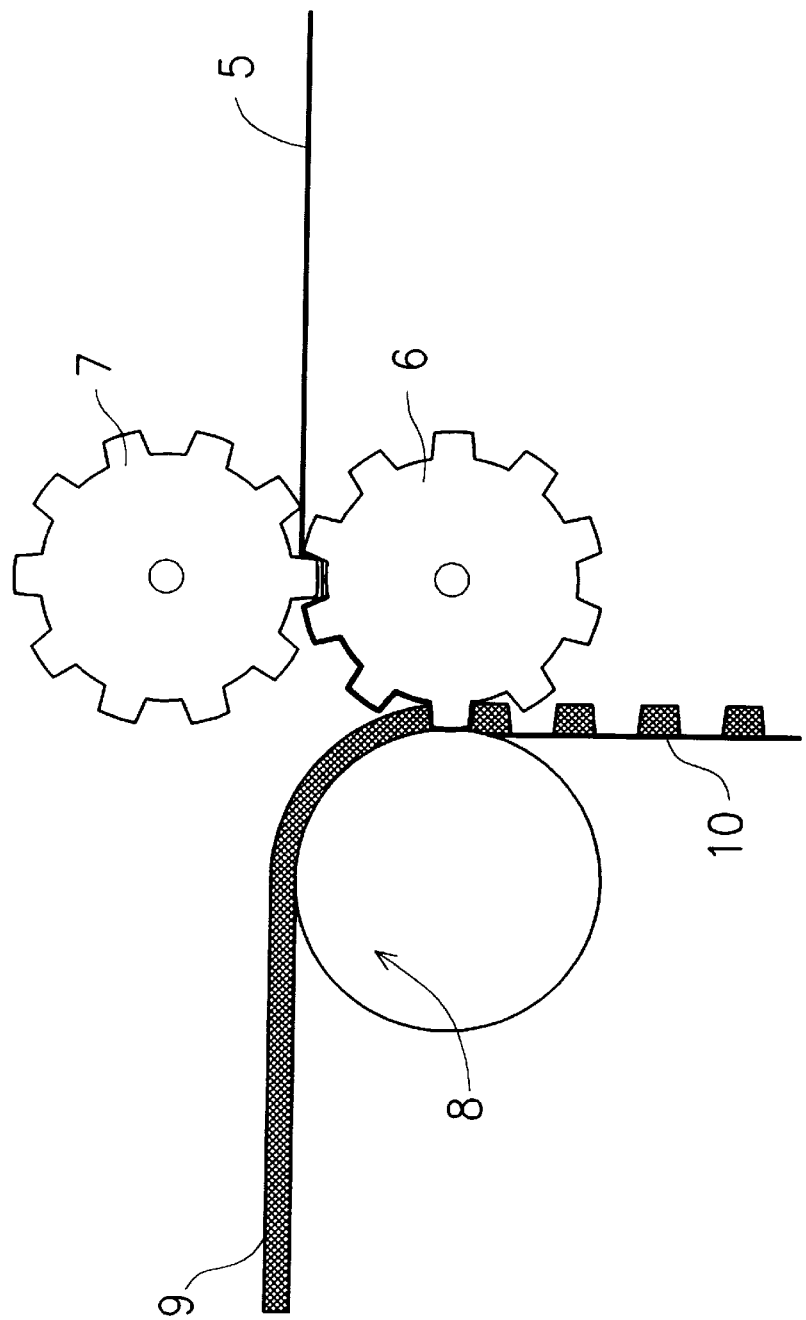
FIG. 4 is a side view of the process shown in FIG. 3.
Figure 5:
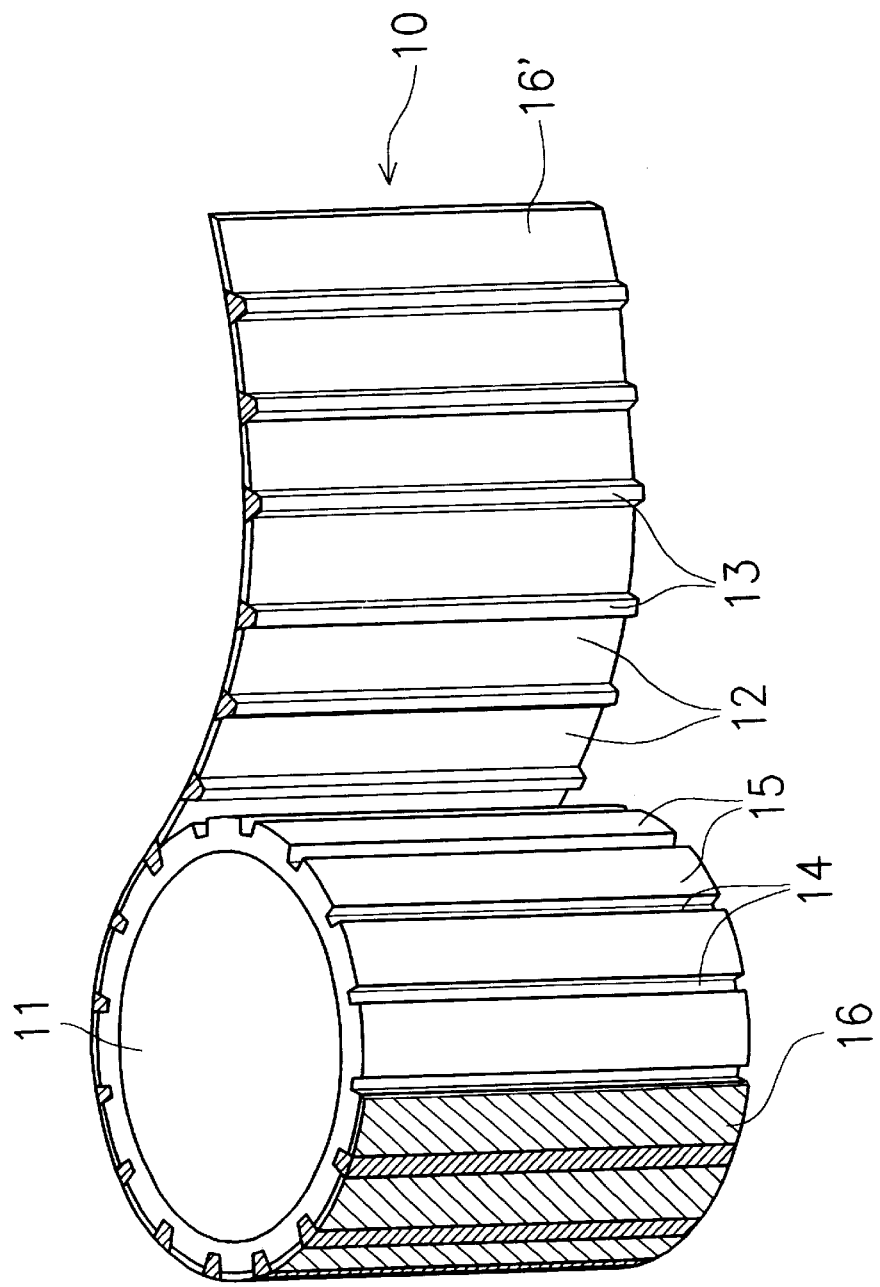
FIG. 5 is a perspective view showing how a piece of fabric treated by the processes shown in FIGS. 3 and 4 is brought to wrap onto a cylindrical mold and to overlap its two ends together, then the toothed fabric with rubber material filled in its grooves was fixed on the cylindrical toothed mold.

FIG. 5 is a perspective view showing how a piece of fabric 10 treated by the processes shown in FIGS. 3 and 4 is brought to overlap its two ends 16, 16' together by means of a cylindrical mold 11 to erect a loop-shaped belt. As shown in FIG. 5, the fabric 10 is brought to wind on the cylindrical mold 11 and its two ends 16, 16' are brought to bind together to build a loop-shaped belt. The rubber material on the two ends serves as glue for binding them together. After this, the fabric 10 is reinforced with wound cord and rubber sheet, and then vulcanized in the manner of conventional belts.

According to this invention, in the process of making a toothed belt, the fabric is soaked with thermosetting resin. Thus, after the fabric is rolled by the pair of preheated toothed rollers, the thermosetting resin will harden and keep the shape of the toothed grooves as it is.

Furthermore, the toothed grooves in the fabric are formed by passing the fabric through a pair of toothed rollers having corresponding toothed grooves thereon. Therefore, compared with conventional fabric whose toothed grooves are formed by impressing a toothed plate on it, the fabric treated by the method according to this invention has much more flexibility or extendibility to comply with bending when under operation. Even a fabric with less elasticity could be used without breach. Furthermore, the tooth contour of the belt made according to this invention will be more accurate than that of a belt made by conventional processes. Also, teeth of the belt made according to this invention will not distorted because the fabric is hard to shrink or extend after passing through the pair of toothed rollers. According to this invention, the rubber material is fed into each of the toothed grooves of the fabric at a properly controlled rate, therefore, no excess or deficiency of rubber material in the toothed grooves will happen. Also, the two flat ends of each piece of the fabric are coated with a thin layer of rubber material which can also be used as an adhesive, this will facilitate the gluing of the two ends of each piece of the fabric.

What is claimed is:

1. A method of making a toothed belt comprising the steps of:
   (a) guiding a strip of fabric to pass through a thermosetting resin to soak the fabric with said thermosetting resin and form a soaked fabric;
   (b) guiding said soaked fabric to pass through a pair of heated and toothed rollers having a plurality of outer teeth wherein said outer teeth are meshed together in a conjugated way to harden the resin in said soaked fabric and to form a series of toothed grooves on said soaked fabric simultaneously;
   (c) keeping said soaked fabric sticking on one of said toothed rollers located at a downstream side of said soaked fabric and simultaneously guiding said soaked fabric to pass by a rotating plane roller in a manner that said soaked fabric moves in said downstream direction with guidance of said rotating plane roller, said rotating plane roller having a smooth outer peripheral surface and being disposed at a distance substantially equal to the thickness of said soaked fabric with said toothed rollers located at said downstream side of said soaked fabric, and simultaneously feeding a rubber material into a space between the outer peripheral surface of said rotating plane roller and said soaked fabric to fill the toothed grooves of said soaked fabric with said rubber material and coat a surface of said soaked fabric with a thin layer of said rubber material;

(d) wrapping said soaked fabric together with said rubber material thereon onto a cylindrical mold having corresponding toothed grooves formed on an outer peripheral surface and gluing two ends of said soaked fabric together to loop around the cylindrical mold in such a manner that the surface of said soaked fabric having said rubber material coated thereon faces outward and the toothed grooves formed in each said soaked fabric mesh together with the corresponding toothed grooves of the cylindrical mold;

(e) covering said strip of fabric together with said rubber material thereon with a cord and a rubber sheet; and (f) vulcanizing said rubber material on said strip of fabric to form a toothed belt.

2. The method of claim 1, further comprising a step (a1), between step (a) and step (b), of guiding said soaked fabric to pass through one pair of squeezing rollers to squeeze excess resin out from said soaked fabric.

3. The method of claim 1 wherein said plurality of outer teeth formed in said toothed rollers located at said downstream side of said soaked fabric have a shape corresponding to that of a plurality of teeth of said toothed belt.

4. The method of claim 1 wherein in step (c), the rubber material is preheated before being filled into the toothed grooves and the plane roller is provided with a cooling device.

5. The method of claim 1 wherein said strip of fabric is produced in the form of a long strip and steps (a) and (b) are performed in a continuous manner, and said soaked fabric is cut into pieces before said wrapping onto the cylindrical mold in step (d).

6. The method of claim 5 wherein two ends of each piece of said soaked fabric are flat for enabling one of said two ends to overlap the other one of said two ends.

7. The method of claim 2, further comprising a step (a2), between step (a1) and step (b), of baking said soaked fabric.

8. The method of claim 1 wherein the thermosetting resin is selected from the group consisting of phenol-formealdehyde, epoxy, polyurethane, mixtures thereof, and the modifiers of said resin.

9. The method of claim 1 wherein the thickness of said soaked fabric is less than the difference between the outer diameter and the pitch diameter of the toothed rollers.

\* \* \* \* \*